United States Patent
Hackstie et al.

[11] Patent Number: 5,702,186
[45] Date of Patent: Dec. 30, 1997

[54] JOURNAL BEARING WITH LEADING EDGE GROOVE VENT

[75] Inventors: Louis F. Hackstie, Lake Mary; Peter J. Clayton, Casselberry, both of Fla.

[73] Assignee: Westinghouse Electric Corporation, Pittsburgh, Pa.

[21] Appl. No.: 691,728

[22] Filed: Aug. 2, 1996

[51] Int. Cl.$^6$ ............................................ F16C 17/03
[52] U.S. Cl. ................................. 384/117; 384/311
[58] Field of Search ........................ 384/306, 307, 384/309, 311, 117, 122, 100

[56] References Cited

U.S. PATENT DOCUMENTS

| | | | |
|---|---|---|---|
| 3,023,055 | 2/1962 | Thompson | 384/117 |
| 3,784,266 | 1/1974 | Parlevliet | 384/286 |
| 3,912,344 | 10/1975 | McCafferty | 384/304 |
| 4,115,865 | 9/1978 | Gerling | 384/309 X |
| 4,291,926 | 9/1981 | Tomioka et al. | 384/311 |
| 4,323,286 | 4/1982 | Vohr | 384/317 |
| 4,337,985 | 7/1982 | Gerling | 384/132 |
| 4,501,505 | 2/1985 | Chambers | 384/152 |
| 4,568,204 | 2/1986 | Chambers | 384/152 |
| 4,714,357 | 12/1987 | Groth et al. | 384/312 |
| 4,824,263 | 4/1989 | Singh | 384/306 |
| 5,288,153 | 2/1994 | Gardner | 384/311 |

*Primary Examiner*—Thomas R. Hannon

[57] ABSTRACT

A journal bearing is disclosed with shoe segments. Each shoe segment has a supply groove for even distribution of oil across the shoe surface during shaft rotation. The supply grooves have bleed vents that relieve pressure build-up in the supply groove by bleeding oil out of the supply groove in a substantially circumferential direction. Directing oil in this way prevents the pressurized oil from impinging on any nearby seals and provides enhanced temperature profile characteristics.

18 Claims, 2 Drawing Sheets

DIRECTION OF SHAFT ROTATION 5,702,186

JOURNAL BEARING WITH LEADING EDGE GROOVE VENT

FIELD OF THE INVENTION

The invention relates to segmented journal bearings. More particularly, the invention relates to an improved shoe segment with a novel oil vent for use in segmented journal bearings.

BACKGROUND OF THE INVENTION

Typical journal bearings for rotating shafts are constructed from a plurality of shoe segments arranged circumferentially around the shaft. These shoe segments are supported by a bearing housing, which is in turn fixed to a frame of the machine which contains the shaft. The shaft rotates within the bearing and is supported by the bearing and its shoe segments during operation of the machine.

During operation, pressurized oil is injected between the shoe segments and the rotating shaft. The shaft thus rides on a film of oil to reduce friction. After the oil is injected between the shoe segments and the shaft, shaft rotation drags some of the oil along the bearing surface of the shoe segments, which lubricates the shaft and reduces friction.

The oil absorbs heat, which is generated by shaft rotation induced friction, from both the shoe segments and the shaft. To improve the efficiency of the oil at reducing friction, the oil is circulated out of the bearing and cooled. The cooled oil is then re-injected between the shoe segments and the shaft, and the process begins again.

The temperature of the oil and the shoe bearing surface varies at points along the surface of the shoe segment. At points along the shoe bearing surface nearer the point where the cool oil first enters the bearing, the oil tends to be cooler. Correspondingly, the shoe bearing surface is cooler at those points. On the other hand, at points along the shoe segment further from the point of cool oil entry onto the shoe bearing surface, the oil tends to be hotter. Correspondingly, the underlying shoe segment surface tends to be hotter. Applicants have recognized that the friction reducing properties of the bearing would be enhanced if the temperature of the oil across the shoe bearing surface were more equalized.

Axial grooves have been incorporated into shoe segment designs to provide even distribution of oil between the shaft and the shoe segment surface. However, such axial grooves have been known to cause undesirable pressure buildup within the groove, which prevent oil from flowing into the shoe segment under normal supply pressure conditions. Prior art designs have vented the groove to alleviate this pressure buildup.

The design depicted in Chambers, U.S. Pat. No. 4,568, 204, incorporates an axial groove in the bearing surface of the shoes. Additionally, the Chambers patent design vents oil from the groove along a path parallel to the axis of rotation of the rotating shaft (i.e. axially). Applicants have recognized that such a design has the potential to cause pressurized oil to impinge upon any nearby seals, prematurely reducing the effectiveness of those seals.

Thus, there is a need for a shoe segment that provides an improved shoe bearing surface temperature profile while directing the flow of oil away from nearby seals.

SUMMARY OF THE INVENTION

The present invention meets the needs above by providing an improved journal bearing having a plurality of shoe segments, wherein each of the shoe segments has a channel for improved oil flow characteristics. Each shoe segment has a supply groove recessed into its bearing surface for evenly distributing oil across the shoe segment. A bleed vent extends from the supply groove to the leading edge of each shoe segment such that oil entering the supply groove vents out through the leading edge in a path parallel to any adjacent seals (i.e. circumferentially). Thus, the oil is not forced against the seals, reducing the likelihood of impairing the operation of the seals. Further, the improved vent bleeds cool oil from each shoe segment such that the cool oil mixes with the hot oil exiting from a contiguous shoe segment.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed.

In the drawings.

DETAILED DESCRIPTION OF A PREFERRED EMBODIMENT

Figure 1:
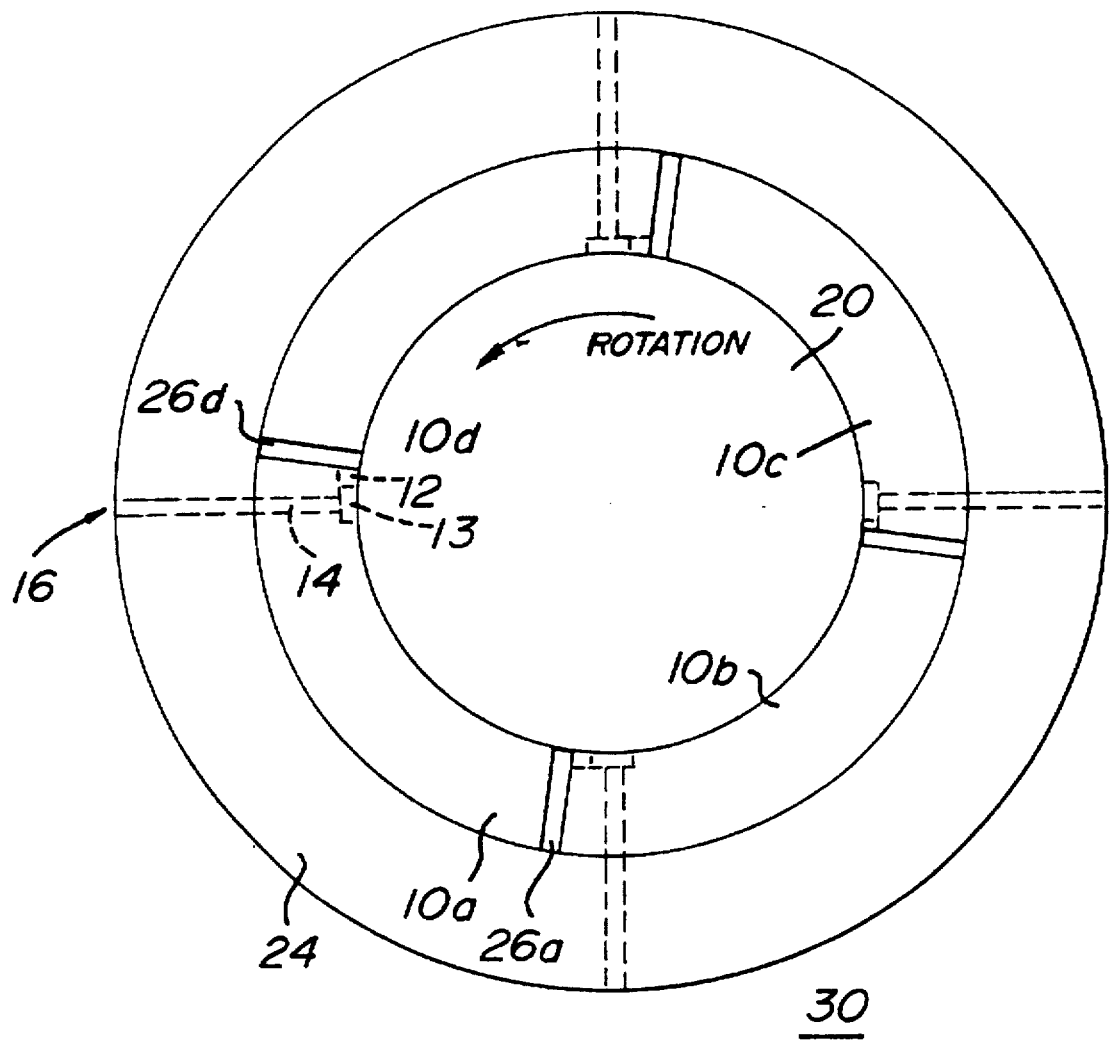
FIG. 1 is a side view of a bearing in which the present invention may be incorporated.

Referring now to the drawings wherein like numerals indicate like elements throughout, FIG. 1 depicts an exemplary bearing 30 in which the present invention may be employed. The bearing 30 supports a rotating shaft 20 and allows the shaft 20 to rotate in a counter clockwise fashion as indicated by direction of the arrow. The shaft 20 has an axis of rotation perpendicular to the view shown. The bearing 30 generally comprises a housing 24, a number of shoe segments 10 and oil feed conduits 14, 16 that supply oil to the bearing surface 28 (shown in FIG. 2) of the shoe segments 10. FIG. 1 depicts a bearing with four shoe segments; however, any suitable number of shoe segments 10 could be appropriately substituted to accommodate a particular application.

The shoe segments 10 are circumferentially arranged in the bearing 30 around a portion of the shaft 20. The shoe segments 10 are supported by the bearing housing 24, which keeps the shoe segments 10 fixed at points around the circumference of the shaft 20. As will be described in more detail below, each shoe segment 10 has a bearing surface 28 that supports the shaft 20, a supply groove 13, an oil feed conduit 14 and bleed vents 12.

Figure 2:
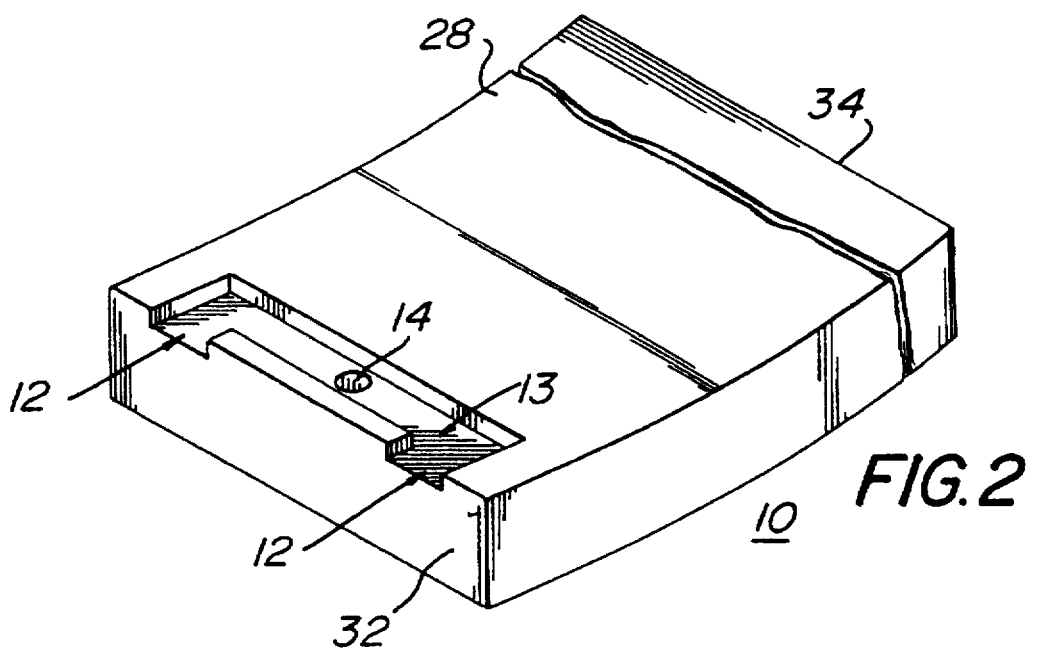
FIG. 2 is an isometric view of a shoe segment incorporating the present invention.
Figure 3:
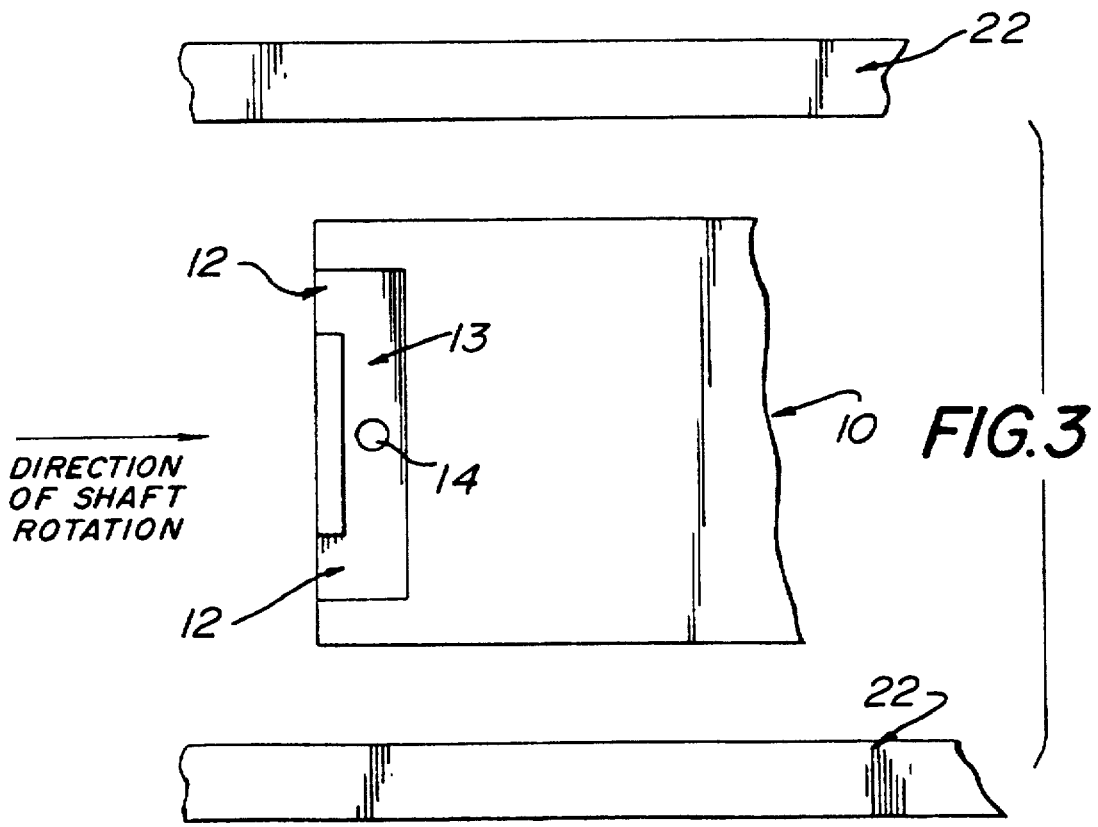
FIG. 3 is a top view of a shoe segment incorporating the present invention.

Referring also to FIGS. 2 and 3, pressurized oil is provided to the bearing through oil supply conduits 16 and 14. Oil entering the bearing travels through the oil supply conduit 16 of the bearing housing 24. There is one oil supply conduit 16 for each shoe segment 10 employed in the bearing 30. The oil supply conduit 16 is in flow communication with oil supply conduit 14 in the shoe segment 10. Pressurized oil then enters the bearing housing 24 through the inlet of oil supply conduit 16 and travels through the bearing housing 24. The pressurized oil exits the bearing housing 24 through the outlet of oil supply tube 16 and enters the shoe segment 10 through the inlet of oil supply conduit 14. The oil then flows through the shoe segment via oil supply conduit 14 and into the supply groove 13 for distribution over the bearing surface 28 of the shoe segment 10.

The rotation of shaft 20 in conjunction with the pressure applied to the oil causes a pumping action of the oil across the bearing surface of shoe segment 10. As the oil is forced across the bearing surface 28 of the shoe segment, 10, it provides a film of oil between the rotating shaft 20 and the shoe segment 10. When the oil has travelled the length of the shoe segment 10, it is forced into the gap 26. Moreover, while the oil is forced along a flow path over the bearing surface 28 of the shoe segment 10, it gathers heat induced by the friction of the rotating shaft 20 against the shoe segment 10. Oil exits the bearing 30 from the sides of the shoe segment 10 and drains to a reservoir (not shown) from which it is pumped and cooled for recirculation.

Simultaneous to the flow of oil across the bearing surface 28 of the shoe segment 10 in the direction of rotation, oil is bled through bleed vents 12 in a circumferential direction opposite to the direction of rotation of the rotating shaft 20. The bleed vents release undesirable pressure that would otherwise build up in the groove. After the oil has just entered the bearing surface 28 of the shoe segment 10, it will not yet have absorbed heat and, as a result, will be cooler than the oil exiting from the trailing edge 34 of a contiguous shoe segment 10. Thus for example, the oil exiting from the trailing edge 34 of shoe segment 10d will be hotter than the bleed oil exiting the shoe segment 10a through the bleed vents 12. The oil flowing from both shoe segments 10a, 10d will then mix in the gap 26d between the shoe segments 10a, 10d. A similar mixing will occur in all gaps 26 between contiguous shoe segments 10. As a result the oil temperature within the gaps 26 will decrease and cool the leading edge 32 of the shoe segments 10.

Referring now particularly to FIGS. 2 and 3, a shoe segment 10 is depicted that embodies aspects of the present invention. Accordingly, the shoe segment 10 has a bearing surface 28 that supports the rotating shaft 20 (shown in FIG. 1), a leading edge 32, a supply groove 13, two bleed vents 12 and an oil supply tube 14. As indicated in the FIGURES, the supply groove 13 is proximately located near the leading edge 32 of the shoe segment 10 and runs transverse across the width of the shoe segment 10. As can be best appreciated from FIG. 3, the supply groove 13 is recessed axially into the shoe bearing surface 28, i.e., in a substantially parallel alignment with respect to the axis of rotation of the rotating shaft 20. Moreover, the bleed vents 12 run substantially perpendicular to the axis of rotation of the rotating shaft 20. Also shown in FIG. 3, two seals 22 are proximately located near the shoe segment 10. These seals 22 could be, for example, pedestal oil seals or hydrogen seals.

The present invention may be embodied in other specific forms without departing from the spirit or essential attributes thereof, for example, a single bleed vent could be utilized rather than two as depicted in the FIGURES. Accordingly, reference should be made to the appended claims, rather than to the foregoing specification, as indicating the scope of the invention.

What is claimed is:

1. A shoe segment for a journal bearing comprising:
   a leading edge;
   a bearing surface for supporting a rotating shaft;
   a supply groove recessed into the bearing surface; and,
   at least one bleed vent extending from said supply groove to the leading edge of the shoe segment such that oil entering the supply groove can bleed through the leading edge in a circumferential path substantially perpendicular to the leading edge and perpendicular to the axis of rotation of the rotating shaft.

2. A shoe segment as in claim 1 further comprising a leading end adjacent to the leading edge and wherein said supply groove is proximately located at said leading end.

3. A shoe segment as in claim 2 wherein said supply groove has at least one oil supply conduit.

4. A shoe segment as in claim 3 wherein said oil supply conduit has an outlet at a bottom of said supply groove.

5. A journal bearing comprising:
   at least one shoe segment having a leading edge and a trailing edge, said at least one shoe segment further having a bearing surface for supporting a rotating shaft;
   a supply groove recessed into said bearing surface; and,
   at least one bleed vent extending from said supply groove to the leading edge of said shoe segment such that oil entering the supply groove can bleed through said leading edge in a path substantially perpendicular to said leading edge and substantially perpendicular to the axis of the rotating shaft.

6. A journal bearing as in claim 5 wherein said at least one shoe segment has a leading end adjacent to said leading edge and wherein said supply groove is proximately located at said leading end.

7. A journal bearing as in claim 5 wherein said supply groove has at least one oil supply conduit.

8. A journal bearing as in claim 7 wherein said oil supply conduit has an outlet at a bottom of said supply groove.

9. A journal bearing comprising:
   at least two shoe segments each having a leading edge and a trailing edge, said at least two shoe segments further having a bearing surface for supporting a rotating shaft;
   a supply groove recessed into said bearing surface; and,
   means for bleeding oil from said supply groove in a path substantially perpendicular to said leading edge such that oil from one of said at least two shoe segments mixes with oil exiting the trailing edge of an other one of said at least two shoe segments.

10. A journal bearing as in claim 9 wherein said means for bleeding oil comprises at least one bleed vent extending from said supply groove to said leading edge.

11. A journal bearing as in claim 9 wherein said at least one shoe segment has a leading end adjacent to said leading edge and wherein said supply groove is proximately located at said leading end.

12. A journal bearing as in claim 9 wherein said supply groove has at least one oil supply conduit.

13. A journal bearing as in claim 12 wherein said oil supply conduit has an outlet at the bottom of said supply groove.

14. A journal bearing comprising:
   at least two shoe segments each having a leading edge and a trailing edge, said at least two shoe segments each further having a bearing surface for supporting a rotating shaft;
   a groove recessed into said beating surface of each of said shoe segments; and
   means for bleeding oil from said groove in a path substantially perpendicular to said leading edge.

15. A journal bearing as in claim 14 wherein said means for bleeding oil comprises at least one bleed vent extending from said groove to said leading edge.

16. A journal bearing as in claim 14 wherein said at least two shoe segments have a leading end adjacent to said leading edge and wherein said groove is proximately located at said leading end.

17. A journal bearing as in claim 14 wherein said groove has at least one oil supply conduit.

18. A journal bearing as in claim 17 wherein said oil supply conduit has an outlet at the bottom of said groove.

* * * * *